(12) United States Patent
Deng

(10) Patent No.: US 11,320,010 B2
(45) Date of Patent: May 3, 2022

(54) BRAKING SYSTEM

(71) Applicant: Honeywell International Inc., Morris Plains, NJ (US)

(72) Inventor: Fangmin Deng, Changsha (CN)

(73) Assignee: Honeywell International Inc., Charlotte, NC (US)

( * ) Notice: Subject to any disclaimer, the term of this patent is extended or adjusted under 35 U.S.C. 154(b) by 167 days.

(21) Appl. No.: 16/838,781

(22) Filed: Apr. 2, 2020

(65) Prior Publication Data

US 2021/0310528 A1    Oct. 7, 2021

(51) Int. Cl.
| | |
|---|---|
| *F16D 55/36* | (2006.01) |
| *B60T 1/06* | (2006.01) |
| *B64C 25/42* | (2006.01) |
| *F16D 65/02* | (2006.01) |

(52) U.S. Cl.
CPC .............. *F16D 55/36* (2013.01); *B60T 1/065* (2013.01); *B64C 25/42* (2013.01); *F16D 2065/1336* (2013.01)

(58) Field of Classification Search
CPC . F16D 55/36; F16D 2065/1336; B64C 25/42; B60T 1/065
See application file for complete search history.

(56) References Cited

U.S. PATENT DOCUMENTS

| | | |
|---|---|---|
| 2,826,274 A | 3/1958 | Albright |
| 3,156,321 A | 11/1964 | Deyerling et al. |
| 3,977,631 A | 8/1976 | Jenny |
| 4,207,968 A | 6/1980 | Chamberlain |
| 4,944,370 A | 7/1990 | Chambers et al. |
| 5,107,968 A | 4/1992 | Delpassand |
| 5,255,761 A | 10/1993 | Zaremsky |
| 5,926,932 A | 7/1999 | Niespodziany et al. |
| 6,938,857 B2 | 9/2005 | DeVlieg |
| 7,237,748 B2 | 7/2007 | Sullivan |
| 8,620,493 B2 | 12/2013 | Hughes et al. |
| 8,910,758 B2 | 12/2014 | Jensen et al. |
| 9,440,733 B2 | 9/2016 | Green et al. |

(Continued)

FOREIGN PATENT DOCUMENTS

| | | |
|---|---|---|
| CN | 106218869 A | 12/2016 |
| GB | 2074262 A | 10/1981 |
| JP | H01269698 A | 10/1989 |

OTHER PUBLICATIONS

"Aircraft Brakes," Aircraft Systems, accessed from https://www.aircraftsystemstech.com/p/aircraft-brakes_9081.html, on Aug. 29, 2019, 32 pp.

(Continued)

*Primary Examiner* — Vishal R Sahni
(74) *Attorney, Agent, or Firm* — Shumaker & Sieffert, P.A.

(57) ABSTRACT

In some examples, a braking system includes a housing configured to rotate around a torque tube. A disc stack includes a plurality of stator discs are coupled to the torque tube and a plurality of rotor discs rotationally coupled to the housing. An actuator within the torque tube is configured to compress the disc stack. A portion of the torque tube may be configured to insert into an axial assembly of a wheel. The housing may be connected to a portion of a wheel rim. The braking system may be present on a wheel instead of or in addition to a main braking system having a main disc stack.

20 Claims, 7 Drawing Sheets

(56) References Cited

U.S. PATENT DOCUMENTS

| | | | |
|---|---|---|---|
| 9,593,726 B2 | 3/2017 | Chambard et al. | |
| 10,023,159 B2 | 7/2018 | Sorin et al. | |
| 10,106,250 B2* | 10/2018 | Sullivan | B64C 25/42 |
| 10,131,329 B1 | 11/2018 | Georgin et al. | |
| 10,288,132 B2 | 5/2019 | Elnekave et al. | |
| 2005/0039990 A1 | 2/2005 | Girod et al. | |
| 2008/0202865 A1 | 8/2008 | Pradier et al. | |
| 2012/0153753 A1* | 6/2012 | Hanlon | H02K 7/102 |
| | | | 310/77 |
| 2016/0096620 A1 | 4/2016 | Kracke | |
| 2017/0363482 A1* | 12/2017 | Bruggemann | G01K 13/08 |
| 2018/0079402 A1 | 3/2018 | Bruggemann et al. | |
| 2019/0120304 A1 | 4/2019 | Laget et al. | |
| 2020/0400204 A1* | 12/2020 | Stras | B60C 23/18 |

OTHER PUBLICATIONS

Extended Search Report from counterpart European Application No. 21163265.8, dated Aug. 24, 2021, 7 pp.

Response to Extended Search Report dated Aug. 24, 2021, from counterpart European Application No. 21163265.8, filed Aug. 25, 2021, 51 pp.

* cited by examiner

BRAKING SYSTEM

TECHNICAL FIELD

The present disclosure relates to wheel braking systems of vehicles.

BACKGROUND

Vehicles, such as aircrafts, may use a wheel braking system that includes a multi-disc brake assembly. For example, the multi-disc brake assembly may include a plurality of rotors engaged with a wheel and a plurality of stators interleaved with the rotors. The rotors and wheel are configured to rotate around an axle, while the stators remain stationary. To decelerate rotational motion of a rotating wheel, the brake assembly may displace pistons against a pressure plate to squeeze the rotating rotors engaged with the wheel against the stationary stators, therefore producing torque that decelerates the rotational motion of the wheel. In some examples, the rotors may be engaged with the wheel via rotor drive keys positioned on an interior surface of the wheel. In some such examples, the rotors may define slots configured to receive the rotor drive keys.

SUMMARY

The present disclosure describes vehicle braking systems including an auxiliary braking system configured to reduce the rotation of a vehicle wheel. The auxiliary braking system may be positioned on the wheel instead of or in addition to a main braking system. In some examples, the auxiliary braking system may be configured such that a vehicle operator (e.g., an aircraft pilot) may initiate either the main braking system or the auxiliary braking system depending on a braking force required or a frequency of braking. For example, an aircraft operator or control circuitry of a vehicle braking system may choose to initiate the main braking system for relatively high energy events such as landing and emergency stops, and choose to initiate the auxiliary braking system for relatively low energy events such as taxiing and parking. Use of the auxiliary braking system may reduce wear and replacement of brake discs in the main braking system.

In some examples, the auxiliary braking system may be configured to accommodate the space constraints of a wheel which includes a main braking system.

In some examples, an auxiliary braking system includes a torque tube defining a wheel axis and a housing configured to rotate around the wheel axis. The auxiliary braking system includes a disc stack having a plurality of rotor discs interleaved with a plurality of stator discs. The plurality of rotor discs are rotationally coupled with the housing. The plurality of stator discs are coupled to the torque tube. The auxiliary braking system is configured such that the housing and the plurality of rotor discs may rotate about the wheel axis while the torque tube and the plurality of stator discs are rotationally stationary. An actuator positioned within a volume of the torque tube is configured to compress the disc stack, causing engagement between friction surfaces of the rotor discs and the stator discs.

The auxiliary braking system may include control circuitry configured to cause the actuator to compress the disc stack based on a braking signal. In examples, a wheel may be configured to operate with a main braking system having a main disc stack, as well as the braking system and disc stack disclosed. The control circuitry may be configured to receive the braking signal and cause at least one of the actuator to compress the disc stack or cause the main braking system to compress the main disc stack.

An example technique for braking using the braking system is additionally described herein.

Clause 1: An auxiliary braking system comprising: a torque tube defining a wheel axis; a housing configured to rotate around the wheel axis; a disc stack comprising a plurality of rotor discs rotationally coupled with the housing; a plurality of stator discs coupled with the torque tube and interleaved with the plurality of rotor discs; and an actuator within the torque tube and configured to compress the disc stack.

Clause 2: The auxiliary braking system of clause 1, wherein the housing is configured to rotate relative to the torque tube.

Clause 3: The auxiliary braking system of clause 1 or 2, wherein one or more rotor discs of the plurality of rotor discs and one or more stator discs of the plurality of stator discs are configured to translate in a direction substantially parallel to the wheel axis.

Clause 4: The auxiliary braking system of any of clauses 1 to 3, wherein the actuator is configured to exert a force on the disc stack in a direction substantially parallel to the wheel axis when the actuator compresses the disc stack.

Clause 5: The auxiliary braking system of any of clauses 1 to 4, wherein one or more rotor discs of the plurality of rotor discs are configured to rotate around the wheel axis.

Clause 6: The auxiliary braking system of any of clauses 1 to 5, further comprising a backing plate coupled to the torque tube, wherein the actuator is configured to compress the disc stack against the backing plate.

Clause 7: The auxiliary braking system of clause 6, wherein the actuator comprises an actuating element configured to translate in a direction substantially parallel to the wheel axis to compress the disc stack against the backing plate.

Clause 8: The auxiliary braking system of clauses 6 or 7, wherein the actuator comprises an actuator housing configured to remain substantially stationary with respect to the torque tube when the actuating element translates in the direction substantially parallel to the wheel axis.

Clause 9: The auxiliary braking system of any of clauses 1 to 8, wherein the actuator comprises an electric motor configured to compress the disc stack.

Clause 10: The auxiliary braking system of any of clauses 1 to 9, further comprising control circuitry in communication with the actuator, wherein the control circuitry is configured to receive a braking signal, and cause the actuator to compress the disc stack in response to receiving the braking signal.

Clause 11: The auxiliary braking system of any of clauses 1 to 10, further comprising: control circuitry configured to receive a braking signal; and a main braking system comprising a main disc stack, wherein the control circuitry is configured to at least one of cause the actuator to compress the disc stack or cause the main braking system to compress the main disc stack based on the braking signal.

Clause 12: The auxiliary braking system of any of clauses 1 to 11, wherein the torque tube is configured to couple with an axial assembly surrounding the wheel axis, and wherein the housing is configured to rotationally couple with a wheel rim configured to rotate around the axial assembly.

Clause 13: The auxiliary braking system of any of clauses 1 to 12, wherein the torque tube is configured to couple with a mandrel surrounding the wheel axis.

Clause 14: The auxiliary braking system of any of clauses 1 to 13, wherein the wheel axis intersects the actuator.

Clause 15: An auxiliary braking system comprising: a wheel rim defining a wheel axis and having an inboard section and an outboard section; a landing gear strut coupled to an axial assembly, wherein the inboard section is between the outboard section and the landing gear strut; a housing rotationally coupled to the outboard section and configured to rotate around the wheel axis; a torque tube within the axial assembly, wherein the torque tube is coupled to the axial assembly; a disc stack comprising: a plurality of rotor discs rotationally coupled with the housing; a plurality of stator discs coupled with the torque tube and interleaved with the plurality of rotor discs; and an actuator within the torque tube and configured to compress the disc stack.

Clause 16: The auxiliary braking system of clause 15, wherein one or more rotor discs of the plurality of rotor discs and one or more stator discs of the plurality of stator discs are configured to translate in a direction substantially parallel to the wheel axis.

Clause 17: The auxiliary braking system of clauses 15 or 16, wherein the actuator is configured exert a force on the disc stack in a direction substantially parallel to the wheel axis when the actuator compresses the disc stack.

Clause 18: The auxiliary braking system of any of clauses 15 to 17, further comprising: a main braking system connected to the wheel rim, wherein the main braking system comprises a main disc stack; and control circuitry configured to: receive a braking signal; and cause the actuator to compress the disc stack or cause the main braking system to compress the main disc stack based on the braking signal.

Clause 19: A method comprising: coupling a plurality of stator discs with a torque tube of a vehicle wheel defining a wheel axis; rotationally coupling a plurality of rotor discs with a housing configured to rotate around the wheel axis, wherein the wherein the plurality of stator discs is interleaved with the plurality of rotor discs; and connecting an actuator configured to translate at least one of the plurality of rotor discs or the plurality of stator discs with a power source.

Clause 20: The method of clause 19, further comprising: connecting the housing to a wheel rim configured to rotate around the wheel axis; and connecting the torque tube to an axial assembly of a landing gear strut.

The details of one or more examples are set forth in the accompanying drawings and the description below. Other features, objects, and advantages will be apparent from the description and drawings, and from the claims.

DETAILED DESCRIPTION

Figure 1:
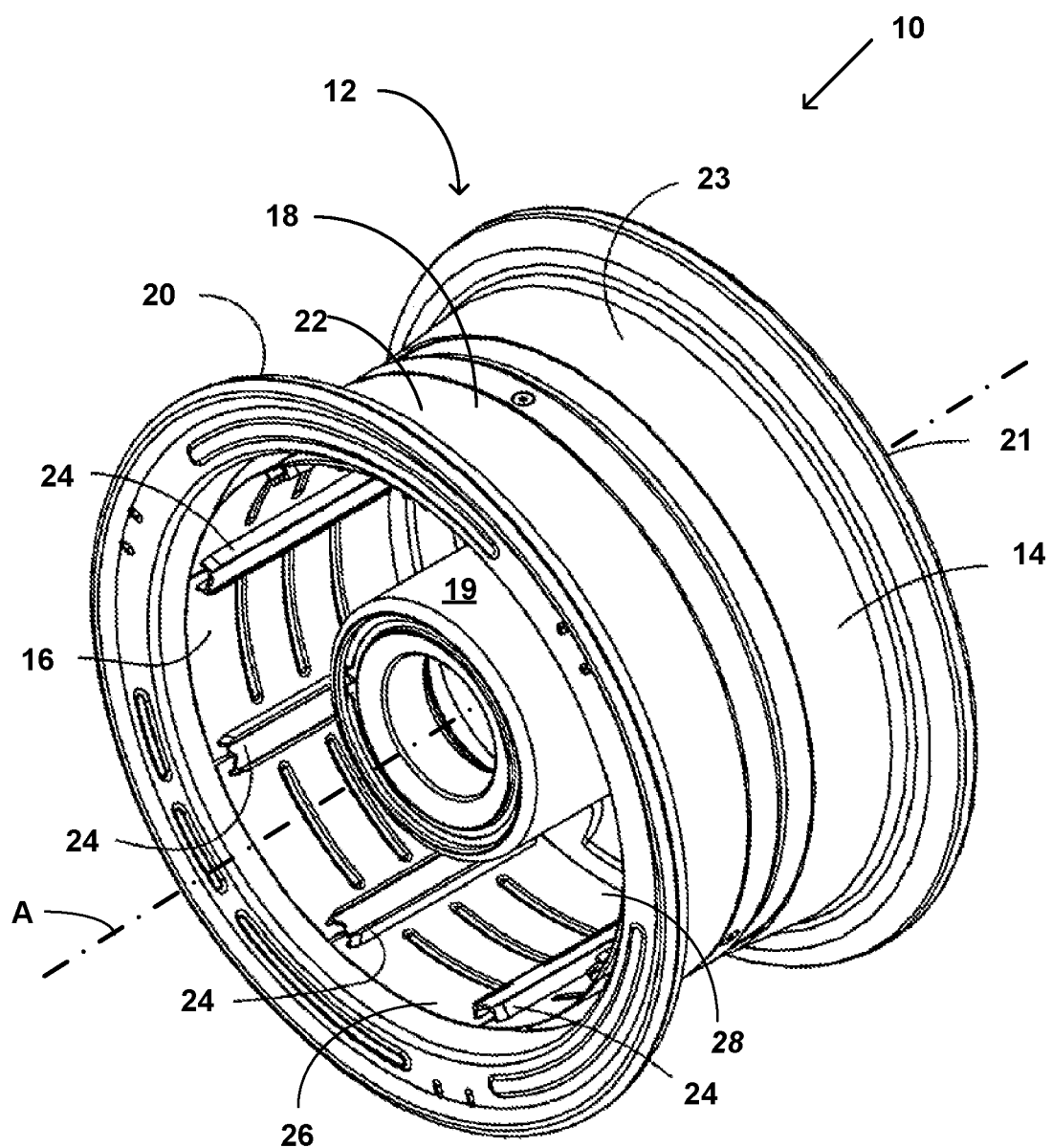
FIG. 1 is a perspective view of an example wheel.

The disclosure describes articles, systems, and techniques relating to a braking system for wheel of a vehicle. A braking system described herein may be utilized instead of or in conjunction with a main braking system. For example, the braking system disclosed here may be an auxiliary braking system configured to operate during reduced braking force events (e.g., aircraft taxiing and/or parking) while the main braking system is configured to operate during typically higher braking force events (e.g., aircraft landing and/or emergency stopping). Utilizing an auxiliary braking system in conjunction with a main braking system may reduce the consumption of friction discs within the main braking system, which may help reduce the frequency of disc replacement in the main braking system and reduce the cost and time requirements of main brake overhaul.

In braking systems which utilize shearing between brake discs in order to dissipate the kinetic energy of a vehicle, the operating temperature of a brake disc may be dependent on the type of braking event initiated. For example, during relatively high energy braking events initiated at relatively high vehicle velocities (e.g., an aircraft landing or emergency braking during takeoff), dissipation of the vehicle's kinetic energy can drive brake disc temperatures beyond a range normally experienced during lower energy braking events (e.g., taxiing and parking). This variation in operating temperature may impact the overall wear rate of certain brake discs. For example, some brake discs may inherently possess a temperature-dependent wear rate sensitivity, such that the wear rate at a first temperature exceeds the wear rate at a second temperature. Consequently, the variation in brake disc operating temperatures when a single braking system is utilized for both relatively high energy braking events (where higher operating temperature might be expected) and lower energy braking events (where lower operating temperatures might be expected) can significantly increase the overall wear on the discs of the braking system. This may be particularly acute when a brake disc is necessarily designed for primary performance at the higher operating temperatures associated with higher energy braking events (such as aircraft landing). Use of such a brake disc at both the higher temperatures associated with high energy events and the lower temperatures associated with lower energy events may lead to a more frequent need for brake disc replacement.

The number of braking events, even relatively low energy events such as taxi stops, may also have a relatively significant impact on the overall wear rate of friction discs in a main braking system. Use of the auxiliary braking system described herein during these relatively low energy braking events may also extend the useful life of friction discs within the main braking system by reducing the number of braking events for which the main braking system is used.

Braking systems including both a main braking system and an auxiliary braking system, as described in some examples herein, may help limit the operating temperatures experienced by the main disc stack and help reduce the frequency of use of a particular one of the braking systems, which may both contribute to a reduced wear rate of both the main disc stack and the auxiliary brake disc stack. The reduced wear rate may, for example, reduce the frequency of disc replacements necessary in one or both of the braking systems. This may be desirable when, for example, a main braking system is more difficult to access than an auxiliary braking system, when replacement of the main disc stack may be more labor intensive than replacement in the auxiliary braking system, when the discs of the main braking system are more expensive than the discs of the auxiliary braking system, or other reasons.

The auxiliary braking system discussed herein may be configured to operate on a wheel of a vehicle in order to reduce a rotation of the wheel (e.g., reduce the speed of the vehicle). The auxiliary braking system may be configured to operate on a wheel which also includes a main braking system, or may be configured to operate on a wheel as a stand-alone braking system (e.g., in the absence of a second braking system). The auxiliary braking system may be utilized to substantially limit the number of braking events and/or operating temperatures experienced by the main disc stack and/or the auxiliary disc stack during braking events.

In some examples, the auxiliary braking system is configured to accommodate the space constraints of a wheel which includes a main braking system. For example, the auxiliary braking system may be configured to position substantially on an outboard section of the wheel (relative to an attached vehicle) while the main braking system is positioned substantially within and on an inboard section of the wheel. The auxiliary braking system may extend from the outboard section to ease access to components of the auxiliary braking system, to allow brake disc sizing relatively independently of space constraints imposed by the wheel, or for other reasons. In some examples, the auxiliary braking system is configured such that a disc stack of the auxiliary braking system extends beyond the wheel, such that the brake discs of the auxiliary system may be sized relatively independently of the space constraints imposed by interior volumes within the wheel.

While the braking system is primarily referred to herein as an auxiliary braking system, in some examples, the braking assembly can be used instead of a conventional main braking system.

In some examples, the auxiliary braking system includes a torque tube defining a wheel axis and a housing configured to rotate around the wheel axis. The housing may be configured to be attached to a wheel rim of a wheel which rotates around the wheel axis. The torque tube may be configured to be mechanically connected to some other portion of a vehicle around which the wheel is configured to rotate (e.g., an axial assembly attached to a strut).

The wheel rim attached to the housing of the auxiliary braking system described may be configured to rotate around an axial assembly which surrounds the wheel axis. The axial assembly may comprise an axial sleeve and a mandrel. One or more bearings between the axial assembly and wheel rim may are configured to enable the wheel rim to rotate about the axial assembly. The housing may be rotationally coupled to the wheel rim such that the housing rotates with the wheel rim around the wheel axis (e.g., around the axial assembly). The torque tube is coupled (e.g., mechanically connected) to the axial assembly (e.g., the axial sleeve and/or mandrel) such that the torque tube remains stationary with respect to the axial assembly (e.g., stationary as the wheel rim and housing rotate around the axial assembly). A portion of the torque tube may effectively insert into an end (e.g., an outboard end) of the axial assembly about which the wheel rim rotates. Thus, the auxiliary braking system may be configured such that a portion of the torque tube resides within an interior volume defined by the axial assembly ("sleeve volume"). In some examples, the axial assembly includes a mandrel and an axial sleeve, and the torque tube is mechanically connected to the mandrel.

The auxiliary braking system includes a plurality of rotor brake discs rotationally coupled to the housing, and a plurality of stator discs are coupled to the torque tube. The plurality of stator discs are interleaved with the plurality of rotor discs to define a brake disc stack. The housing may be configured to at least partially surround the disc stack. The disc stack is configured such that, when compressed, the friction surfaces of adjacent rotor discs and stator discs are urged into engagement. When the rotor brake discs are rotating relative to the stator brake discs (e.g., when the housing coupled to the wheel rim is rotating relative to the torque tube mechanically connected to the axial assembly), the engagement between friction surfaces of the rotor brake discs and the stator brake discs converts the kinetic energy of the rotating rotor brake discs into thermal energy and slows the rotation of the rotor brake discs. Due to the rotational coupling between the rotor brake discs, the housing, and the wheel rim, rotation of the wheel rim is similarly reduced. The shearing forces generated between the friction surfaces of the rotor brake discs and the stator brake discs are transmitted to the torque tube and the axial assembly as the rotation of the wheel rim reduces.

An actuator resides within an interior volume defined by the torque tube ("torque tube interior volume"). In examples, the torque tube interior volume is configured to reside within the sleeve volume of the axial assembly. The actuator is configured to exert a force on the disc stack in a direction substantially parallel to the wheel axis, compressing the disc stack. The actuator may include an actuating element (e.g., a piston) configured to translate in a direction substantially parallel (e.g., parallel or nearly parallel to the extent permitted by manufacturing tolerances) to the wheel axis in order to compress the disc stack when braking is initiated. The actuating element may be attached to a pressure plate which translates with the actuating element and acts on the disc stack, in order to compress the disc stack between the pressure plate and a backing plate coupled to the torque tube.

In some examples, the wheel may include an inboard section connected to an outboard section (e.g., an inboard half and an outboard half), with the inboard section and the outboard section configured to rotate around the axial assembly as a substantially unitary body. The wheel may be configured such that, when the wheel rotates around the axial assembly, the inboard section is between the outboard section and a strut coupling the wheel to a vehicle frame. The wheel may be configured such that a main braking system is substantially supported by the inboard section while the auxiliary braking system described herein is supported by the outboard section of the wheel. The housing may be attached to the outboard section such that, when the wheel rotates around the axial assembly, the housing rotates with the wheel as the torque tube remains substantially stationary with respect to the axial assembly.

As discussed, in some examples, the wheel may be configured to operate with a main braking system, and the auxiliary brake assembly described herein may be utilized instead of or in conjunction with the main braking system. in The auxiliary braking system may include control circuitry in communication with the actuator, with the control circuitry configured to receive a braking signal and cause the actuator to compress the disc stack in response to the braking signal. In some examples in which a vehicle includes both a main braking system and an auxiliary braking system, the control circuitry may be configured to receive the braking signal and cause either the actuator to compress the disc stack of the auxiliary braking system, or cause the main braking system to compress a main disc stack in order to reduce rotation of the wheel. The braking signal might be generated, for example, by a pedal within an aircraft where a first amount of depression (e.g., for a taxi stop) of the pedal, as detected by any suitable sensor, causes the control circuitry to control the actuator of the auxiliary braking system to compress the disc stack, and a second amount of depression (e.g., for a runway stop, or emergency stop) of the pedal causes the control circuitry to control the main braking system to compress the main brake stop. In other examples, other systems and techniques for selecting the main braking system or the auxiliary braking system to slow a vehicle speed may be used.

FIG. 1 is a perspective view illustrating an example wheel 10. In some examples, wheel 10 is a part of an aircraft vehicle. In other examples, wheel 10 may be a part of any other vehicle, such as, for example, any land vehicle or other vehicle. In the example shown in FIG. 1, wheel 10 includes a wheel rim 12 defining an exterior surface 14 and interior surface 16. Wheel rim 12 includes tubewell 18 and wheel hub 19. In some examples, interior surface 16 may include an inner diameter of tubewell 18 of wheel 10. For example, in some cases, interior surface 16 may be referred to as an inner diameter surface of wheel 10. In some examples, a tire (not shown) may be mounted on exterior surface 14 of rim 12. Wheel 10 may include an inboard bead seat 20 and an outboard bead seat 21 configured to retain a tire on exterior surface 14 of rim 12. In examples, Wheel 10 may comprise an inboard section 22 (e.g., including inboard bead seat 20) and an outboard section 23 (e.g., including outboard bead seat 21). Wheel 10 is configured to rotate around the axis of rotation A.

Wheel 10 includes a plurality of rotor drive keys 24 on interior surface 16 of wheel 10. In some examples, each rotor drive key of the plurality of rotor drive keys 24 extends in a substantially axial direction of wheel 10 (e.g., in a direction parallel to the axis of rotation A). The plurality of rotor drive keys 24 and interior surface 16 are configured to be substantially stationary with respect to each other, such that when wheel 10 (and interior surface 16) rotates around axis of rotation A, each of the rotor drive keys 24 translates over a closed path around axis A. Consequently, when wheel 10, interior surface 16, and rotor drive keys 24 are rotating around axis of rotation A, a force on one or more of rotor drive keys 24 opposing the direction of rotation acts to slow or cease the rotation. As will be discussed, rotor drive keys 24 may be configured to receive a torque from a main braking system (not shown) configured to reduce and/or cease a rotation of wheel 10. Rotor drive keys 24 may be integrally formed with interior surface 16, or may be separate from and mechanically affixed to interior surface 16.

Figure 2:
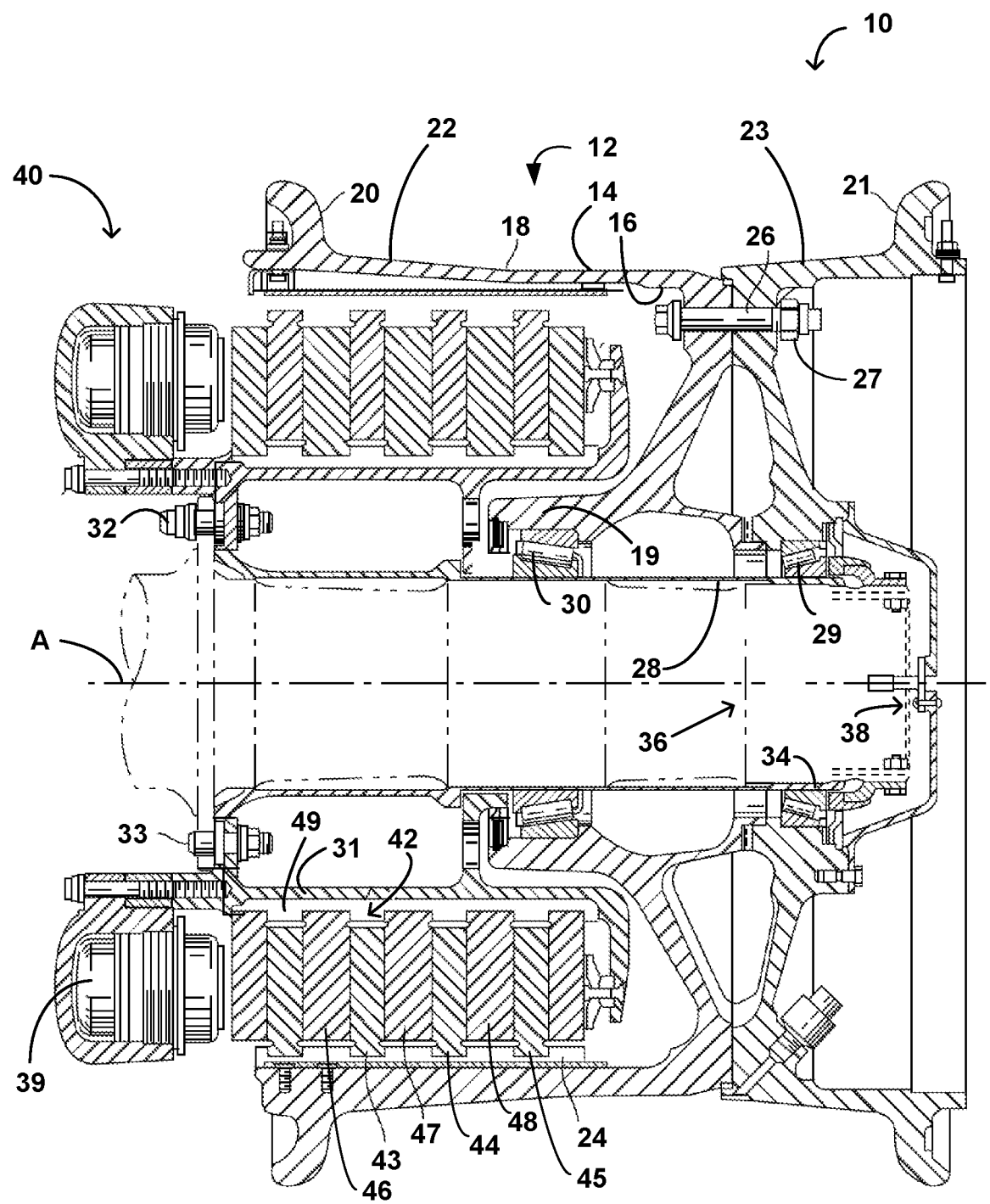
FIG. 2 is a schematic cross-sectional view of an example main braking system positioned on the example wheel of FIG. 1.

FIG. 2 is a schematic cross-sectional view illustrating an example wheel 10 including a rotor drive key 24, interior surface 16, wheel rim 12, exterior surface 14, tubewell 18, inboard bead seat 20, outboard bead seat 21, inboard section 22, and outboard section 23. FIG. 2 illustrates wheel rim 12 as a split rim wheel with lug bolt 26 and lug nut 27 connecting inboard section 22 and outboard section 23, however wheel rim 12 may utilize other configurations (e.g., a unified wheel rim) in other examples.

Wheel 10 is configured to rotate about axis A extending through axial assembly 28. Axial assembly 28 is figured to support wheel 10 while allowing wheel 10 to rotate around axis A using bearings 29 and 30. Bearings 29, 30 are configured to allow wheel 10 to rotate around axial assembly 28 and include a bearing track defining a closed path around axial assembly 28. Bearings 29, 30 may define a substantially circular track around axial assembly 28. A main torque tube 31 is coupled to axial assembly 28 (e.g., via bolts 32, 33), such that main torque tube 31 remains substantially stationary when wheel 10 rotates around axial assembly 28. Main torque tube 31 may at least partially surround an exterior of axial assembly 28. Axial assembly 28 may be mechanically coupled to a strut attached to a vehicle (e.g., a landing gear strut (not shown)).

An interior surface 34 of axial assembly 28 ("sleeve interior surface 34") may define a sleeve volume 36. Sleeve volume 36 is a void within axial assembly 28 extending over some displacement substantially parallel to axis A and defining a sleeve opening 38 at an end of axial assembly 28. Sleeve interior surface 34 may be substantially configured as an interior cylindrically shaped surface, and may define sleeve volume 36 as a substantially cylindrical volume.

A main braking system 40 may be positioned within wheel 10 and configured to engage main torque tube 31 and rotor drive key 24. Main braking system 40 is configured to generate a torque to oppose a rotation of wheel 10 around axis A and transfer the torque to rotor drive key 24, reducing and/or eliminating the rotation of wheel 10 around axis A. Main braking system 40 includes a main disc stack 42 which includes one or more main rotor discs (e.g., main rotor discs 43, 44, 45) and one or more main stator discs (e.g., main stator discs 46, 47, 48).

Main rotor discs 43, 44, 45 and/or main stator discs 46, 47, 48 may be substantially annular discs surrounding axial assembly 28. Main rotor discs 43, 44, 45 are rotationally coupled to rotor drive key 24 and interior surface 16 and rotate substantially synchronously with wheel 10 around axis A. Main stator discs 46, 47, 48 are coupled to main torque tube 31 via spline 49 and remain rotationally stationary with main torque tube 31 (and axial assembly 28) as wheel 10 rotates. A main actuator 39 is configured to compress main disc stack 42 to bring friction surfaces of main rotor discs 43, 44, 45 into contact with friction surfaces of main stator discs 46, 47, 48, generating shearing forces between the discs and exerting a torque on rotor drive key 24 opposing the rotation of wheel 10. Thus, main braking system 40 may be utilized to reduce and/or eliminate the rotation of wheel 10.

Wheel 10 may support any variety of private, commercial, or military aircraft or other type of vehicle. Wheel 10 may be mounted to a vehicle using, for example, bolts 32 and/or bolt 33, or some other fastening device. Axial assembly 28 may be mounted on a strut of a landing gear (not shown) or other suitable component of a vehicle to connect wheel 10 to the vehicle. Wheel 10 may rotate around axis A and axial assembly 28 to impart motion to the vehicle. Wheel 10 is shown and described to provide context to the auxiliary braking system described herein, however the auxiliary braking system described herein may be used with any suitable wheel assembly in other examples.

Figure 3:
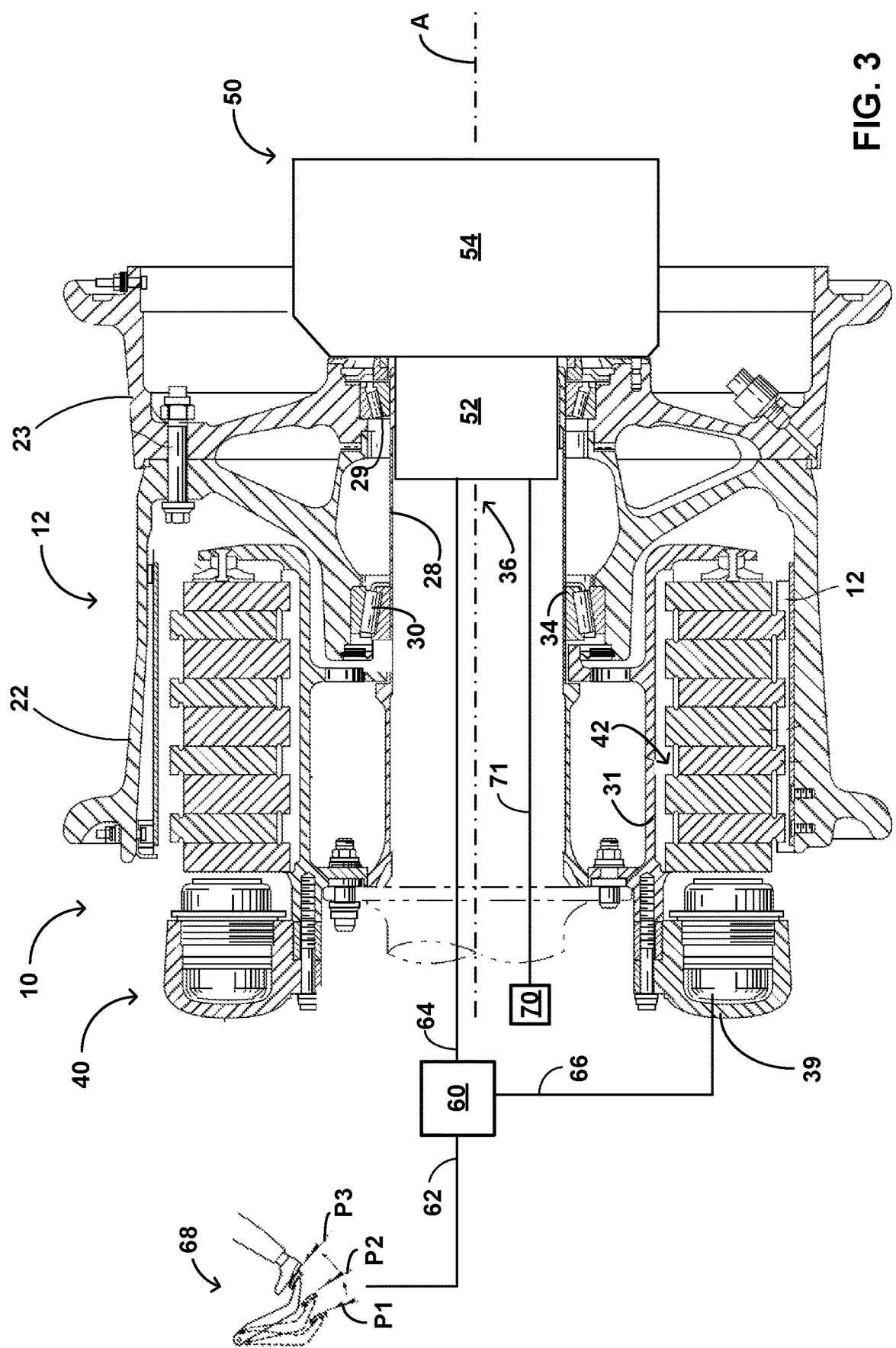
FIG. 3 is a plan view with selected cross-sections of an example auxiliary braking system positioned on a wheel including the main braking system of FIG. 2.
Figure 4:
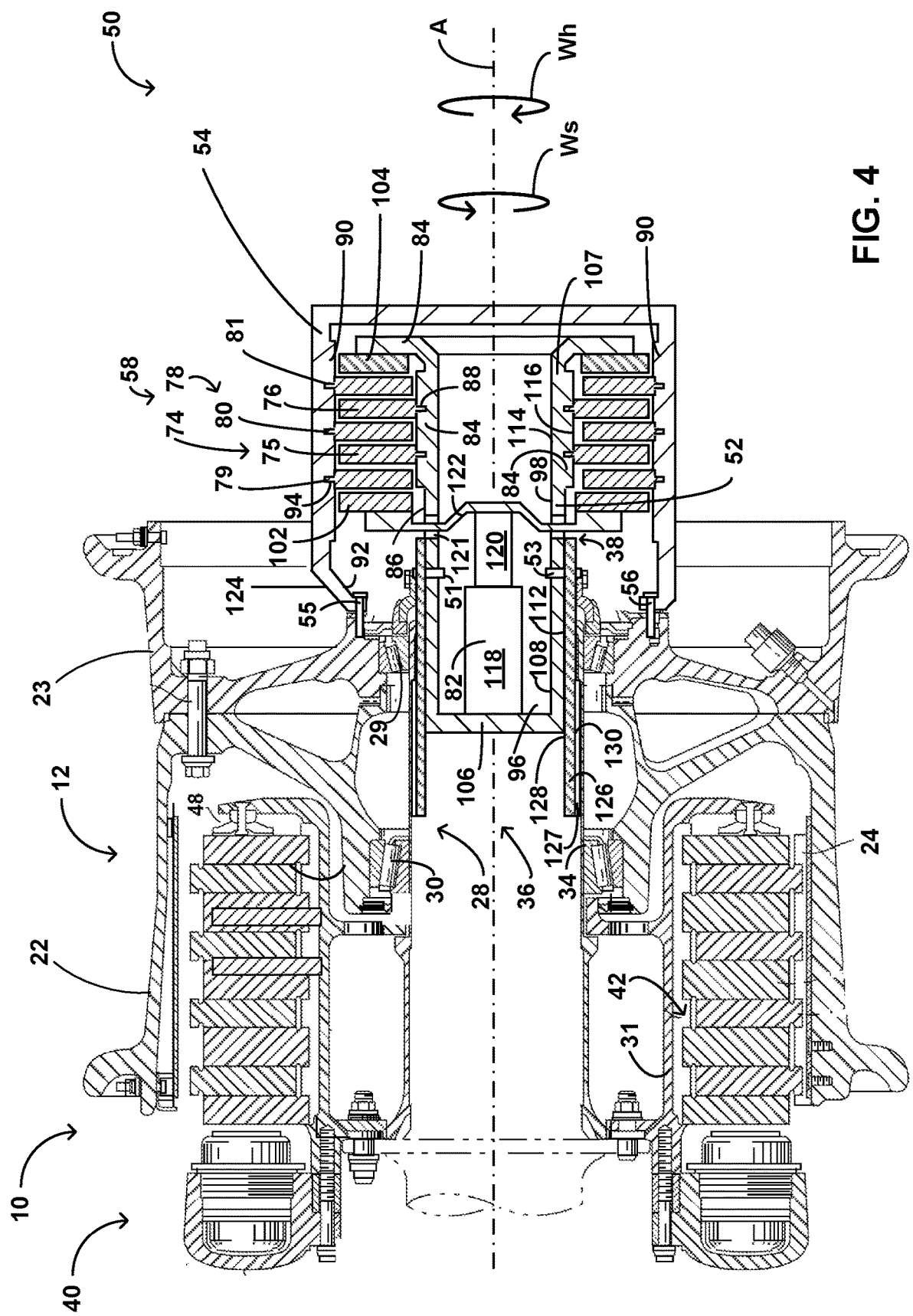
FIG. 4 is a cross-sectional view of an example auxiliary braking system positioned on a wheel including the main braking system of FIG. 2
Figure 6:
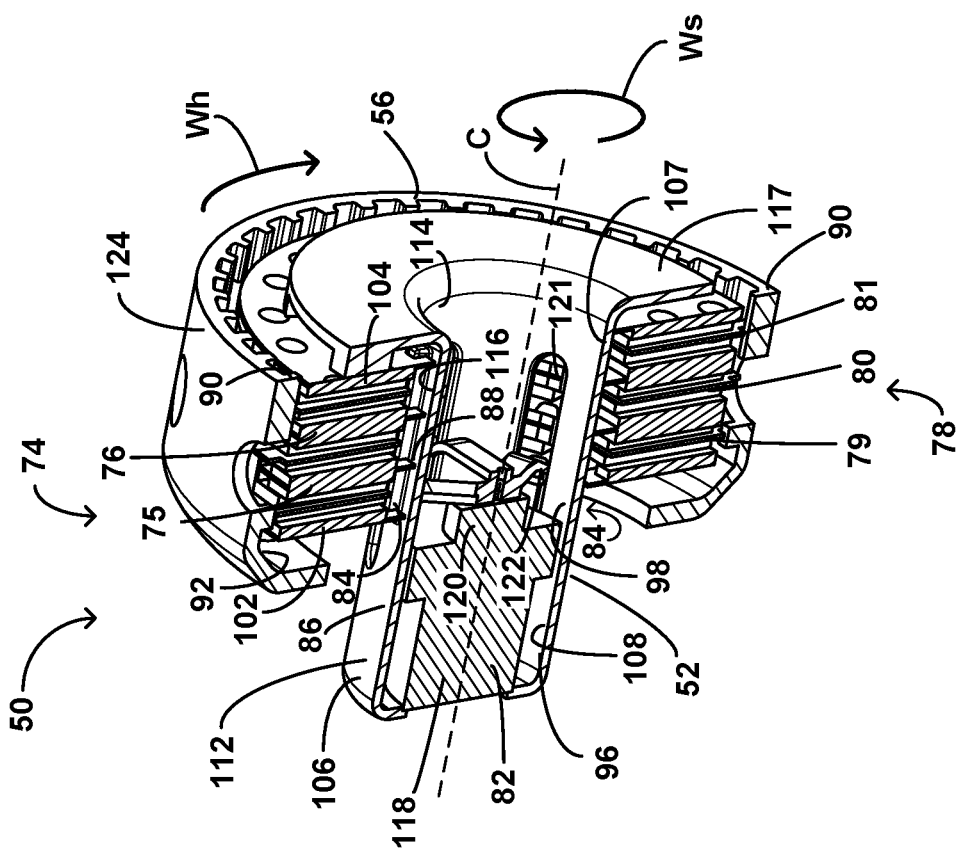
FIG. 6 is a perspective view of an example auxiliary braking system with selected cross-sections of the auxiliary braking system.
Figure 7:
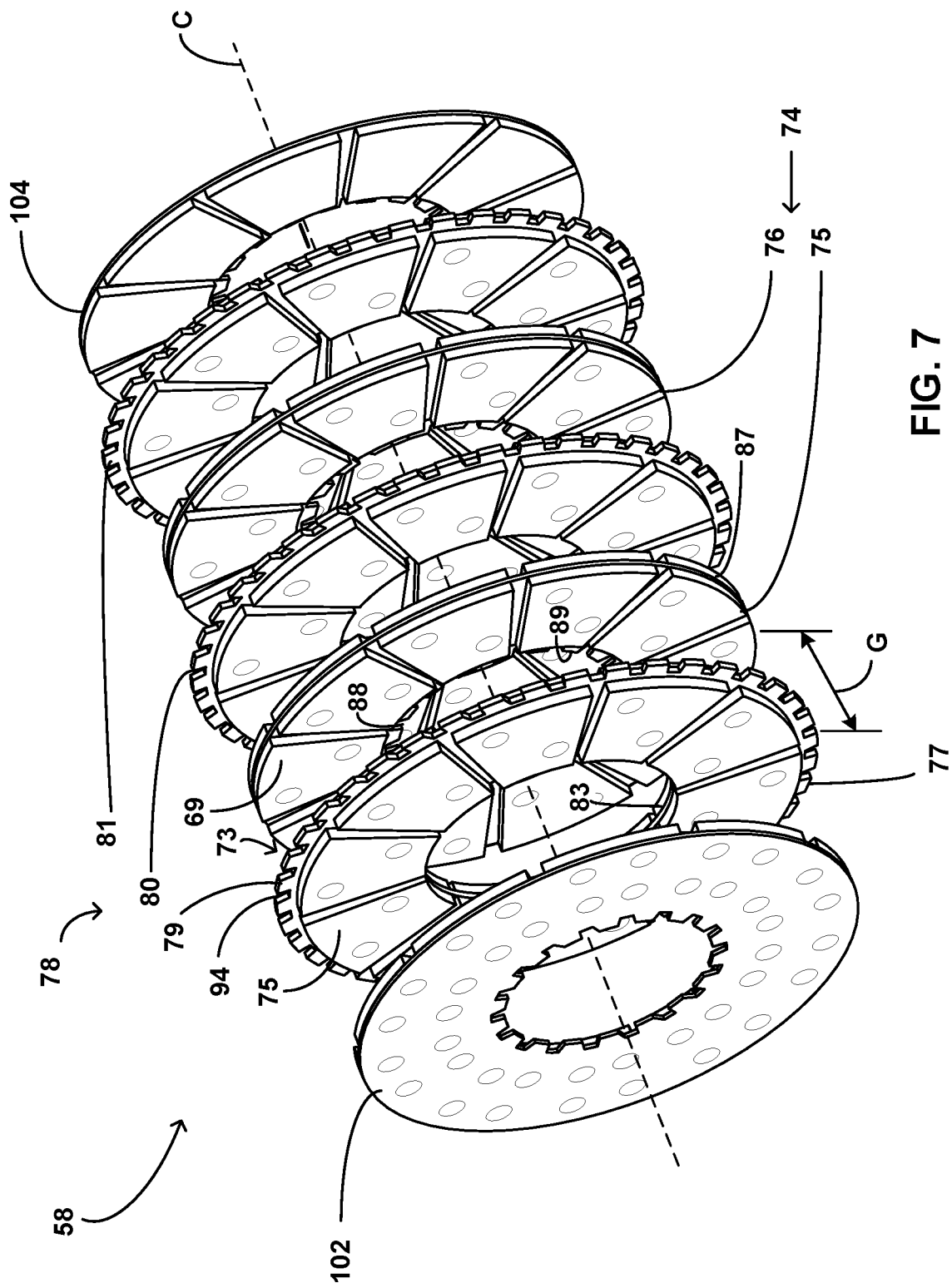
FIG. 7 is a perspective view of a disc stack of an example braking system.

FIG. 3 illustrates an example auxiliary braking system 50 on wheel 10. FIG. 3 illustrates auxiliary braking system 50 positioned on outboard section 23 of wheel 10 while main braking system 40 is positioned on inboard section 22 of wheel 10. Auxiliary braking system 50 includes a torque tube 52 and a housing 54 configured to be rotatable around at least some portion of torque tube 52. Torque tube 52 is coupled to axial assembly 28 (e.g., via pin 55 and/or pin 53) and configured to be substantially stationary with respect to axial assembly 28. Housing 54 is rotationally coupled to wheel 10 (e.g., via pin 55 and/or pin 56) and configured to rotate substantially synchronously with wheel 10. As will be discussed with respect to FIG. 4, auxiliary braking system 50 includes a disc stack 58 within housing 54 (FIGS. 4, 6, and 7). Disc stack 58 is configured such that, when housing 54 (and wheel 10) is rotating about axis A relative to torque tube 52 and disc stack 58 is compressed, shearing forces within the disc stack 58 act to reduce and/or eliminate the rotation of housing 54 (and wheel 10). Thus, auxiliary braking system 50 may act substantially independently of main braking system 40 to reduce and/or eliminate the rotation of wheel 10.

In examples, a braking system includes control circuitry 60 configured to control auxiliary braking system 50, and, if present, main braking system 40. Control circuitry 60 is configured to receive a braking signal (e.g., via communication link 62) and cause auxiliary braking system 50 (e.g., via communication link 64) to compress the disc stack 58 to reduce and/or eliminate the rotation of wheel 10. Control circuitry 60 may be configured to receive the braking signal and cause either auxiliary braking system 50 (e.g., via communication link 64) to compress disc stack 58, or cause main braking system 40 e.g., via communication link 66) to compress main disc stack 42 to reduce and/or eliminate the rotation of wheel 10. In some examples, the braking signal may be initiated by an operator using an interface 68 (e.g., a foot pedal or another input mechanism) configured to generate either a braking signal causing initiation of auxiliary braking system 50 or a braking signal causing initiation of main braking system 40. Consequently, in some examples, the operator may determine which of auxiliary braking system 50 or main braking system 40 is engaged. For example, when wheel 10 is mounted to an aircraft, an operator may choose to initiate main braking system 40 during typically higher braking force events (e.g., aircraft landing and/or emergency stopping) and choose to initiate auxiliary braking system 50 during reduced braking force events (e.g., aircraft taxiing and/or parking). Thus, the use of auxiliary braking system 50 may reduce the amount of hot taxiing events on main disc stack 42, reducing the wear and frequency of replacement required for main disc stack 42.

In other examples, however, control circuitry 60 is configured to automatically determine which of auxiliary braking system 50 or main braking system 40 is engaged in response to receiving a braking signal from the user input mechanism. For example, control circuitry 60 may activate one of auxiliary braking system 50 or main braking system 40 to slow wheel 10 based on the extent to which a user depresses foot pedal 68 or otherwise based on the user input.

As illustrated at FIG. 3, auxiliary braking system 50 may be configured to at least partially position within axial assembly 28 (e.g., within sleeve volume 36). For example, some portion of torque tube 52 may position within axial assembly 28. This allows auxiliary braking system 50 to effectively utilize available space when wheel 10 is accommodating other components, such as main torque tube 31, rotor drive keys 24, main disc stack 42, and other components of main braking system 40. Further, this may diminish the extent to which auxiliary braking system 50 extends beyond wheel 10 (e.g., beyond outboard section 23). Further, auxiliary braking system 50 may be configured to partially position outside of axial assembly 28. For example, housing 54 may position outside of axial assembly 28. This may ease access to components of auxiliary braking system 50 for installation, inspection, or repair. In addition, positioning housing 54 outside of axial assembly 28 may allow positioning the disc stack 58 (FIG. 4) within housing 54 outside of axial assembly 28 to remove volume constraints on the size of the disc stack 58, such that various discs in the disc stack 58 may provide friction surfaces of greater area.

A power supply 70 may be configured to provide power to auxiliary braking system 50 via, for example, power line 71 extending through axial assembly 28. In examples, power supply 70 is an electrical power supply and power line 71 is configured to provide electrical power to auxiliary brake system 50. In some examples, power lines 71 is a conduit configured to deliver a pressurized fluid, such as a hydraulic or pneumatic conduit, and power supply 70 is configured to deliver the pressurized fluid. As will be discussed, an actuator within auxiliary brake system 50 may be configured to receive power (electrical or otherwise) from power line 71. Although power line 71 is depicted as passing through axial assembly 28 in FIG. 3, power line 71 may have other arrangements in other examples.

FIG. 4 illustrates a cross-section of an example auxiliary braking system 50 on an example wheel 10, the cross-section being taken parallel to axis A in FIGS. 1 and 2. FIG. 4 illustrates auxiliary braking system 50 positioned on outboard section 23 of wheel 10 while main braking system 40 is positioned on inboard section 22 of wheel 10. Wheel 10 is configured to rotate about axis A extending through axial assembly 28 in the same manner as described for FIGS. 1 and 2. Main braking system 40, main disc stack 42, main torque tube 31, and rotor drive key 24 are included for context in FIG. 4, however the presence of main braking system 40, main disc stack 42, main torque tube 31, and rotor drive key 24 on wheel 10 is not required to position and utilize auxiliary braking system 50 on a wheel. Auxiliary braking system 50 may be positioned and operate on wheel 10 with or without the inclusion of main braking system 40, main disc stack 42, main torque tube 31, and rotor drive key 24 on wheel 10.

Figure 5:
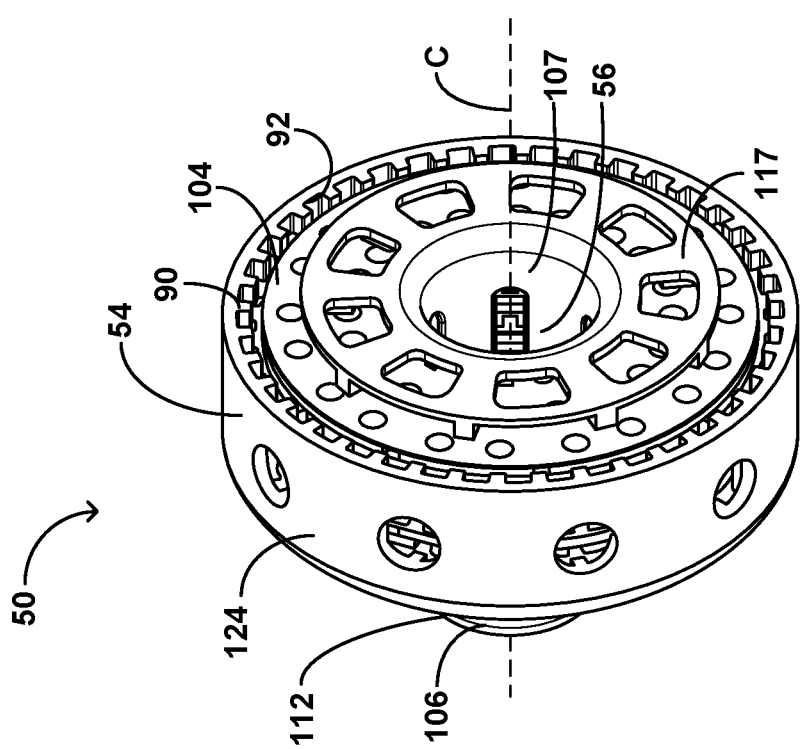
FIG. 5 is a perspective view of an example auxiliary braking system.

FIG. 5 is a perspective of view of an example auxiliary braking system 50, including housing 54 and torque tube 52. FIG. 6 illustrates a cross-sectional perspective view of an example auxiliary braking system 50 including housing 54 and torque tube 52. FIGS. 5 and 6 include a central axis C, which may be substantially parallel to axis A of wheel 10 when auxiliary braking system 50 is positioned on wheel 10.

As illustrated in FIG. 4, torque tube 52 is mechanically connected to axial assembly 28 (e.g., via pin 51 and pin 53) and configured to remain substantially stationary with respect to axial assembly 28. Housing 46 is mechanically connected to wheel outboard section 23 (e.g., via pin 55 and pin 56) and configured to rotate substantially synchronously with wheel 10 about axis A. Torque tube 52 and housing 54 are configured such that housing 54 may rotate with respect to torque tube 52 about central axis C (or axis A when auxiliary braking system 50 is positioned on wheel 10).

Auxiliary braking system 50 further comprises disc stack 58. Disc stack 58 includes a plurality of stator discs 74 (including stator discs 75, 76) and a plurality of rotor discs 78 (including rotor discs 79, 80, 81). The plurality of stator discs 74 are coupled with torque tube 52, such that stator discs 75, 76 are rotationally stationary with respect to torque tube 52 (and rotationally stationary with axial assembly 28 when auxiliary braking system 50 is positioned on wheel 10). The plurality of rotor discs 78 are rotationally coupled with housing 54, such that rotor discs 79, 80, 81 rotate substantially synchronously with housing 54 (and with wheel 10 when auxiliary braking system 50 is positioned on wheel 10). An actuator 82 is positioned within torque tube 52 and configured to compress disc stack 58.

FIG. 7 is an example perspective view of disc stack 58 illustrating the plurality of stator discs 74 (including stator discs 75, 76) and the plurality of rotor discs 78 (including rotor discs 79-81). The plurality of stator discs 74 are interleaved with the plurality of rotor discs 78. Central axis C is included for reference to FIGS. 5 and 6. Disc stack 58 is illustrated in an uncompressed condition with opposing friction surfaces of adjacent stator and rotor discs are disengaged. For example, as illustrated at FIG. 7, an air gap G exists between rotor disc 79 and stator disc 75 such that friction surface 73 of rotor disc 79 and friction surface 69 of stator disc 75 are substantially disengaged (e.g., not in contact with each other). The air gap G may have any value (e.g., may be larger or smaller than illustrated, relative to disc stack 58). Each of stator discs 75, 76 and rotor discs 79-81 may have a first friction surface (e.g., friction surface 73 of rotor disc 79) and a second friction surface (e.g., friction surface 75 of rotor disc 79) on an opposite side of the respective disc from the first friction surface. Each of stator discs 75, 76 and rotor discs 79-81 may be configured to include an outer perimeter and an inner perimeter. For example, FIG. 7 illustrates rotor disc 79 having outer perimeter 77 and inner perimeter 83, and stator disc 75 having outer perimeter 87 and inner perimeter 89. In some examples, each of stator discs 75, 76 and rotor discs 79-81 may be substantially annular shaped discs, but an have other shapes in other examples.

Torque tube 52 (FIG. 3-6) is configured to limit rotational movement of stator discs 75, 76 around central axis C relative to torque tube 52 while allowing stator discs 75, 76 to translate axially in a direction substantially parallel (e.g., parallel or nearly parallel to the extent permitted by manufacturing tolerances) to central axis C (and/or axis A). Torque tube 52 is configured such that a torque on stator discs 75, 76 around central longitudinal axis C (e.g., torque Ws (FIGS. 4 and 6)) imparts to torque tube 52. Thus, when auxiliary braking system 50 is positioned on wheel 10 and torque tube 52 is mechanically connected to axial assembly 28 (e.g., via pins 51, 53), when stator discs 75, 76 impart the torque Ws to torque tube 52, torque tube 52 exerts an opposing reaction torque on stator discs 75, 76 to limit rotational movement of stator discs 75, 76. Stator discs 75, 76 may be coupled to torque tube 52 using any suitable technique. In some examples, torque tube 52 includes one or more splines 84 (FIGS. 4, 6) extending over an outer surface 86 of torque tube 52 ("torque tube outer surface 86") and configured to engage an inner perimeter (e.g., inner perimeter 89 (FIG. 6, 7) of one or more of stator discs 75, 76. Spline 84 may be an elongated member configured to extend through a spline slot on an inner perimeter of stator discs 75, 76 (e.g., through spline slot 88 (FIG. 4, 6, 7) on inner perimeter 89).

Housing 54 (FIGS. 3-6) is configured to cause rotor discs 79-81 to rotate substantially synchronously with housing 54 around central axis C, while allowing rotor discs 79-81 to translate axially in a direction substantially parallel to central axis C. Housing 54 is configured to impart a torque to rotor discs 79-81 around central axis C (e.g., torque Wh (FIGS. 4 and 6)) to rotor discs 79-81. Thus, when auxiliary braking system 50 is positioned on wheel 10 and housing 54 is mechanically connected to wheel rim 12 (e.g., via pins 51, 53), when wheel rim 12 imparts the torque Wh to housing 54 causing housing 54 to rotate about axis A, housing 54 imparts at least a portion of the torque Wh to rotor discs 79-81 causing rotor discs 79-81 to rotate substantially synchronously about axis A. Rotor discs 79-81 may be coupled to housing 54 using any suitable technique. In examples, housing 54 includes one or more drive keys 90 (FIGS. 4-6) extending over an inner surface 92 of housing 54 ("housing inner surface 92") and configured to engage the outer perimeter (e.g., outer perimeter 77 (FIG. 6)) of one or more of rotor discs 79-81. Drive key 90 may be an elongated member configured to extend through a drive key slot on an outer perimeter of rotor discs 79-81 (e.g., through drive key slot 94 (FIGS. 5 and 6) on outer perimeter 77.)

Actuator 82 (FIGS. 4 and 6) resides within an interior volume 96 defined by an interior surface 98 of torque tube 52 ("torque tube interior surface 98"). Torque tube interior surface 98 at least partially surrounds and faces central axis C (and/or axis A when auxiliary braking system 50 is positioned on wheel 10). Actuator 82 is mechanically connected to torque tube 52 such that torque tube 52 limits movement of at least some portion of actuator 82, relative to torque tube 52. Actuator 82 is configured to exert a force on disc stack 58 (FIGS. 4, 6, and 7) causing disc stack 58 to compress (e.g., causing substantial elimination of the air gap G (FIG. 7)). Actuator 82 may be configured to exert a force substantially parallel to central axis C on disc stack 58 (and/or substantially parallel to axis A when auxiliary braking system 50 is positioned on wheel 10). In examples, actuator 82 is configured to exert a force on pressure plate 102 FIGS. 4, 6, and 7), causing pressure plate 102 to translate in a direction substantially parallel to central axis C and compress disc stack 58 against backing plate 104.

Consequently, auxiliary braking system 50 is configured such that, when wheel 10 rotates with respect to and around axial assembly 28 (and axis A), housing 54 and rotor discs 79-81 rotate substantially synchronously with wheel 10 around axial assembly 28, while torque tube 52 and stator discs 75, 76 remain substantially stationary with respect to axial assembly 28. Wheel 10 imparts a rotational torque about axis A to housing 54, which housing 54 imparts as torque Wh (FIG. 4, 6) on rotor discs 79-81. When actuator 82 acts to compress disc stack 58, stator discs 75, 76 and rotor discs 79-81 laterally translate in a direction substantially parallel to axis A. The lateral translation of stator discs 75, 76 and rotor discs 79-81 substantially eliminate air gap G (FIG. 7) between adjacent brake discs and engage friction surfaces of rotor discs 79-81 with opposing friction surfaces of stator discs 75, 76 (e.g., engage friction surface 69 of stator disc 75 with friction surface 73 of rotor disc 79). Engagement of the frictional surfaces generate shearing forces between the discs (e.g., between rotor disc 79 and stator disc 75), which cause stator discs 75, 76 to impart a torque about axis A (e.g., torque Ws (FIGS. 4, 6)) on torque tube 52. Torque tube 52, which is mechanically connected to axial assembly 28 (e.g., via pins 51, 53), transmits at least a portion of the torque Ws to axial assembly 28. Axial assembly 28 exerts an opposing reaction torque on torque tube 52, causing torque tube 52 and stator discs 75, 76 to remain substantially stationary with respect to wheel 10. The shearing forces between rotor discs 79-81 and stator discs 75, 76 additionally reduce the kinetic energy of rotor discs 79-81, housing 54, and wheel 10, reducing and/or eliminating the rotation of wheel 10 about axis A.

As illustrated in FIGS. 4-6, torque tube 52 may include an insertion section 106 configured to position within axial assembly 28 (e.g., within sleeve volume 36) and an extension section 107 configured to extend outside of axial assembly 28 (e.g., outside of sleeve volume 36). Insertion section 106 may define interior volume 96 holding actuator 82. Providing for placement of actuator 82 within axial assembly 28 may diminish the extent to which auxiliary braking system 50 extends beyond wheel 10 (e.g., beyond outboard section 23) when auxiliary braking system 50 is positioned on wheel 10. Further, providing for placement of actuator 82 within axial assembly 28 effectively utilizes remaining available space when wheel 10 is accommodating other components, such as main torque tube 31, rotor drive keys 24, main disc stack 42, and other components of main braking system 40. Additionally, placing actuator 82 within axial assembly 28 may allow signal and electrical power lines to extend through axial assembly 58 enroute to connecting with actuator 58.

An inner surface 108 of insertion section 106 ("insertion inner surface 108) may define interior volume 96 (FIGS. 4, 6) of torque tube 52. Insertion inner surface 108 may be mechanically connected to or a contiguous (e.g., unbroken) surface joined with torque tube interior surface 98. Insertion inner surface 108 is configured to face central axis C and/or axis A, and may at least partially surround central axis C and/or axis A. Insertion inner surface 108 may define interior volume 96 such that central axis C and/or axis A of wheel 10 passes through interior volume 96 when insertion section 106 is within sleeve volume 36. Insertion section 106 further includes an outer surface 112 ("insertion outer surface 112") (FIGS. 4-6) configured to face in a direction substantially opposite insertion inner surface 108. In some examples, insertion outer surface 112 may substantially define an exterior cylindrical surface. Insertion section 106 is configured such that, when insertion section 106 mechanically connects to axial assembly 28, insertion inner surface 108 and insertion outer surface 112 are substantially stationary with respect to axial assembly 28.

Insertion section 106 may be mechanically connected to axial assembly 28 (e.g., via pins 51, 53) such that a torque around axis A (e.g., some portion of the torque Ws (FIGS. 4 and 6) on insertion section 106 is transmitted from insertion section 106 to axial assembly 28, substantially limiting rotational motion of insertion section 106. Although insertion section 106 is illustrated at FIG. 4 using pins 51, 53 for mechanical connection to axial assembly 28, insertion section 106 may be mechanically connected to axial assembly 28 using any suitable technique, such as, but not limited to, pins, bolts, nuts, adhesives, engineering fits, fusion, friction, or welding or soldering.

Extension section 107 (FIGS. 4-6) may be configured to provide a portion of torque tube 52 extending outside of sleeve volume 36, such that disc stack 58 may reside outside the space constraints of axial assembly 28. Extension section 107 may be configured to couple with stator discs 75, 76 via, for example, spline 84. Configuring torque tube 52 to place disc stack 58 outside of axial assembly 28 may ease access to disc stack 58 when, for example, stator discs 75, 76 and/or rotor discs 79-81 require installation, inspection, and/or replacement. Additionally, placing disc stack 58 outside of axial assembly 28 removes the constraints of sleeve volume 36 on the size of disc stack 58 allowing, for example, friction surfaces of stator discs 75, 76 and rotor discs 79-81 to be increased (relative to examples in which disc stack 58 is positioned within axial assembly 28). In some examples, when insertion section 106 is positioned within sleeve volume 36, sleeve opening 38 is between insertion section 106 and extension section 107.

Extension section 107 may include an inner surface 114 ("extension inner surface 114") (FIGS. 4 and 6) configured to substantially face central axis C and/or axis A, and an outer surface 116 ("extension outer surface 116") on a substantially opposite side of extension section 107 from extension inner surface 114. In some examples, extension inner surface 114 forms a continuous (e.g., unbroken) surface joined with torque tube interior surface 98 and/or some portion of insertion inner surface 108. In some examples, extension outer surface 116 forms a continuous (e.g., unbroken) surface joined with some portion of torque tube outer surface 86 and/or insertion outer surface 112. Extension section 107 (e.g., extension outer surface 116) may be mechanically connected to one or more splines 84 (FIG. 4, 6) such that, when one or more of stator discs 61, 63 exert the torque Ws (FIG. 3) on spline 84, spline 84 transmits at least portion of the torque to extension section 107.

Splines 84 are configured to extend over an outer surface 86 of torque tube 52 ("torque tube outer surface 86" (FIGS. 4-6)), and configured to remain substantially stationary with respect to each other and torque tube outer surface 86. Splines 84 are configured to receive a torque around axis A from stator discs 75, 76 (e.g., due to shearing forces with rotor discs 79-81) and transmit at least a portion of the torque to torque tube 52. Splines 84 are configured to engage the inner perimeter (e.g., inner perimeter 89 (FIG. 7)) of one or more of stator discs 75, 76 to receive the torque from stator discs 75, 76 while allowing lateral translation of stator discs 75, 76 when disc stack 58 is compressed by actuator 58. For example, splines 84 may each be an elongated member configured to extend through a spline slot on an inner perimeter of stator discs 75, 76 (e.g., through spline slot 88 (FIGS. 4, 6, and 7) on inner perimeter 89). In some examples, the one or more splines 84 extend in a direction substantially parallel to central axis C (or axis A when auxiliary braking system 50 is positioned on wheel 10) and are configured to allow slidable translation of spline slot 88 (and stator disc 75) in the direction substantially parallel to central axis C and/or axis A. Splines 84 may extend radially outward from torque tube outer surface 86 (in a direction away from axis A and/or central axis C) such that a portion of a spline 84 substantially faces a portion of spline slot 88 to oppose motion of stator discs 75, 76 around axis A and/or central axis C. Splines 84 may be integrally formed with torque tube outer surface 86, or may be separate from and mechanically affixed to torque tube outer surface 86.

Extension section 107 may configured to engage backing plate 104 (FIG. 4, 5, 7) such that backing plate 104 remains substantially stationary with respect to extension section 107 when actuator 82 compresses disc stack 58. In some examples, extension section 107 may include a flange 117 (FIGS. 4-6) configured to engage backing plate 104 and oppose movement of backing plate 104 when actuator 82 compresses disc stack 58. Flange 117 may be configured to extend in a direction away from central axis C and/or axis A. In some examples, extension section 107 is configured such that extension inner surface 114 flares outward to form a substantially contiguous (e.g., unbroken) surface with flange 117. Flange 117 may extend at least partially around central axis C and/or axis A.

In some examples, torque tube 52 is a unitary component including both extension section 107 and insertion section 106 as a single unified piece. In other examples, insertion section 106 and extension section 107 are separate components that are attached to each other or to torque tube 52 using a suitable technique, such as, but not limited to, pins, bolts, nuts, adhesives, engineering fits, fusion, friction, or welding or soldering. The connection between extension section 107 and insertion section 106 may be substantially permanent, or, alternatively, may be configured to enable separation of extension section 107 and insertion section 106, such that extension section 107 and/or insertion portion 106 remain substantially usable upon separation.

As discussed, actuator 82 (FIGS. 5, 6) resides within interior volume 96. Interior volume 96 may be defined by an interior surface 98 of torque tube 52 ("torque tube interior surface 98"). Actuator 82 is configured to exert a force on disc stack 58 (FIGS. 4, 6, and 7) causing disc stack 58 to compress (e.g., causing substantial elimination of the air gap G (FIG. 7)). Actuator 82 is configured to exert a force substantially parallel to central axis C on disc stack 58 (and/or substantially parallel to axis A when auxiliary braking system 50 is positioned on wheel 10).

Actuator 82 is mechanically connected to torque tube 52 (e.g., connected to insertion section 106) such that torque tube 52 limits movement of at least some portion of actuator 82, relative to torque tube 52. For example, an actuator body 118 of actuator 82 may be mechanically connected to torque tube 52 (e.g., to insertion section 106) such that actuator body 118 is substantially stationary with respect to torque tube 52. Actuator 82 may include a piston 120 configured to extend from actuator body 118, such actuator 82 may cause movement of piston 120 relative to actuator body 118 and torque tube 52. Actuator 82 may be configured within interior volume 96 such that piston 120 exerts the force on disc stack 58 when piston 120 extends from actuator body 118. For example, piston 120 may be configured to exert a force on one or more of pressure arms 122 mechanically connected to pressure plate 102 (FIGS. 4, 6). Thus, actuator 82 may be configured to translate pressure plate 102 relative to torque tube 52 to cause compression of disc stack 58 between pressure plate 102 and backing plate 104 (FIGS. 4, 6, and 7).

Pressure arm 122 is configured such that when actuator 82 exerts a force substantially parallel to central axis C and/or axis A, pressure arm 122 transmits the force to disc stack 58 (e.g., via pressure plate 102). Pressure arm 122 may be mechanically connected to piston 120 and/or pressure plate 102. In examples, actuator 82 is positioned within interior volume 96 of torque tube 52 and disc stack 58 at least partially surrounds torque tube outer surface 86, and pressure arm 122 is configured to transmit a force from actuator 82 to disc stack 58. Pressure arm 122 may be configured to extend radially from actuator 82 (e.g., away from central axis C and/or axis A) and pass through an access 121 defined by torque tube 52, wherein access 121 is configured to provide a passage through torque tube 52 between torque tube interior surface 98 and torque tube outer surface 86.

Actuator 82 may utilize any power source to effectuate the compression of disc stack 58. In examples, actuator 82 includes an electric motor configured to exert a force on disc stack 58 (e.g., via pressure arms 122) in response to a communication received from control circuitry 60 (FIG. 3). In some examples, actuator 82 includes a harmonic drive configured to convert rotation of an electric motor (e.g., a rotation around axis C) into a lateral translation of piston 120 (e.g., a translation substantially parallel to axis C). However, in other examples, actuator 82 may be configured to drive piston 120 in any manner, including other types of gearing within actuator 82, a piston cylinder configured to receive a pressurized fluid (e.g., hydraulic, pneumatic, etc.), or other methods.

As discussed, housing 54 (FIGS. 5 and 6) is configured to be rotationally coupled with wheel 10, such that housing 54 rotates about axis A substantially synchronously with wheel 10. Housing 54 is configured to receive a torque from wheel 10 (e.g., the torque Wh (FIGS. 4 and 6)) and transmit some portion of the torque to rotor discs 79-81, generating rotation of rotor discs 79-81 around central axis C and/or axis A. Housing 54 is configured to be rotatable around at least some portion of torque tube 52, such that housing 54 may drive rotation of rotor discs 79-81 as torque tube 52 maintains stator discs 75, 76 substantially stationary with respect to housing 54 and rotor discs 79-81. Housing 54 is configured to impart this rotation to rotor discs 79-81 while allowing rotor discs 79-81 to translate axially in a direction substantially parallel to central axis C and/or axis A.

Housing 54 is additionally configured to receive an opposing torque from rotor discs 79-81. For example, when rotor discs 79-81 are rotating relative to stator discs 75, 76 and actuator 82 compresses disc stack 58, rotor discs 79-81 engage stator discs 75, 76 and generate shearing forces to reduce the kinetic energy and rotational speed of rotor discs 79-81. Housing 54 is configured such that the reduced rotational speed of rotor discs 79-81 imparts an opposing torque on housing 54 (e.g., a torque opposing torque Wh (FIGS. 4, 6)). When housing 54 is positioned on wheel 10, housing 54 is configured to transmit this opposing torque to wheel 10, reducing the rotation of wheel 10.

Housing 54 is configured to at least partially surround some portion of torque tube 52. In an example, housing 54 at least partially surrounds extension section 107 (FIGS. 4-6), such that housing 54 resides outside of axial assembly 28. This may allow disc stack 58 to position outside the space constraints of axial assembly 28 so that, for example, access to disc stack 58 may be enabled by removing housing 54 without also requiring removal of torque tube 52 from axial assembly 28. Additionally, locating housing 54 outside of axial assembly 28 removes the constraints of sleeve volume 36 on the size of disc stack 58 allowing, for example, stator discs 75, 76 and rotor discs 79-81 to provide friction surfaces of greater area.

Housing 54 includes housing inner surface 92 configured to substantially face central axis C and/or axis A, and an outer surface 124 ("housing outer surface 124") on a substantially opposite side of housing 54 from housing inner surface 92. Housing inner surface 92 and/or housing outer surface 124 may be configured to at least partially surround disc stack 58 and some portion of torque tube 52 (e.g., extension section 107). Housing inner surface 92 may be mechanically connected to one or more drive keys 90 (FIGS. 4 and 6) configured to transmit a torque from housing 54 to rotor discs 79-81 (e.g., transmit some portion of the torque Wh). Drive keys 90 are configured to extend over inner surface 92, and configured to remain substantially stationary with respect to each other and inner surface 92.

Drive keys 90 are configured to engage the outer perimeter (e.g., outer perimeter 77 (FIG. 7)) of one or more of rotor discs 79-81 to transmit the torque from housing 54 while allowing lateral translation of rotor disks 65-67 relative to stator discs 75, 76. For example, drive keys 90 may each be an elongated member configured to extend through a drive key slot on an outer perimeter of rotor discs 79-81 (e.g., through drive key slot 94 (FIGS. 4 and 7) on outer perimeter 77). In some examples, the one or more drive keys 90 extend in a direction substantially parallel to central axis C (or axis A when auxiliary braking system 50 is positioned on wheel 10) and are configured to allow slidable translation of drive key slot 94 (and rotor disc 79) in the direction substantially parallel to central axis C and/or axis A. Drive keys 90 may extend radially inward from housing interior surface 92 (in a direction toward axis A and/or central axis C), such that a portion of a drive key 90 substantially faces a portion of drive key slot 94 to transmit torque to rotor discs 79-81. Drive keys 90 may be integrally formed with housing interior surface 92, or may be separate from and mechanically affixed to housing interior surface 92.

In some examples, a mandrel 126 (FIG. 4) is positioned within sleeve volume 36 between some portion of torque tube 52 and axial assembly 28. For example, axial assembly 28 may include mandrel 126 and axial sleeve 127. Axial sleeve 127 may at least partially surround mandrel 126. Mandrel 126 may be configured to provide transition between torque tube 52 to axial sleeve 127, such that the portion of torque tube 52 fits relatively snugly within mandrel 126 as mandrel 126 fits relatively snugly in axial sleeve 127. An interior surface 128 of mandrel 126 ("mandrel interior surface 128") may be configured to at least partially surround the portion of torque tube 52 within sleeve volume 36 (e.g. Insertion section 106). For example, mandrel interior surface 128 may engage (e.g., frictionally engage) some portion of torque tube outer surface 86 (e.g., insertion outer surface 112). In examples, mandrel interior surface 128 is configured to substantially conform to the portion of torque tube outer surface 86. An exterior surface 130 of mandrel 126 ("mandrel exterior surface 130") may be configured such that mandrel 126 substantially inserts into sleeve volume 36 between torque tube 52 and axial sleeve 127. For example, mandrel exterior surface 130 may be configured to engage (e.g., frictionally engage) some portion of sleeve interior surface 34. In examples, mandrel exterior surface 130 is configured to substantially conform to the portion of sleeve interior surface 34.

As discussed, control circuitry 60 (FIG. 3) is configured to receive a braking signal from interface 68 (FIG. 3) and cause auxiliary braking system 50 to compress disc stack 58 to reduce and/or eliminate the rotation of wheel 10. In some examples, control circuitry 60 may be configured to receive the braking signal and cause either auxiliary braking system 50 to actuate (e.g., to compress disc stack 58), or cause a main braking system to actuate (e.g., cause main braking system 40 to compress main disc stack 42) based on the braking signal. The braking signal may include a signal characteristic indicative of a required brake force or a type of braking event (e.g., a relatively high energy braking event such as a landing and or an emergency stops, or a relatively low energy braking event such as braking during taxiing or parking).

In some examples, interface 68 may be configured for initiate the braking signal in response to an action by an operator. Interface 68 may be configured to distinguish between input actions, such that a first braking signal is sent for a first input action, a second braking signal is sent for a second input action, and so on. For example, interface 68 may include a force sensor configured to detect an amount of force applied by a user to a brake pedal, or a displacement sensor configured to detect an amount of displacement of the brake pedal. The amount of force or the amount of displacement may correspond to different braking events. Control circuitry 60 may be configured such that the control circuitry 60 causes main braking system 40 to actuate in response to the first braking signal, and causes auxiliary braking system 50 to actuate in response to the second signal. In some examples, control circuitry 60 may be configured to refrain from causing both the auxiliary braking system 50 and the main braking system 40 to actuate in either the absence of a braking signal or the presence of a third signal (e.g., a signal different from the first signal and the second signal). In some examples, control circuitry 60 may be configured to cause both auxiliary braking system 50 and main braking system 40 to actuate in response to a fourth signal (e.g., a signal different from the first signal, the second signal, and the third signal). Control circuitry 60 may be configured to receive the braking signal from interface 68 via, for example, communication link 62.

For example, as illustrated at FIG. 3, in some examples, interface 68 includes a foot pedal within a vehicle attached to wheel 10, the foot pedal including a component (e.g., a force sensor) in communication with control circuitry 60 via a communications link 62. The foot pedal may include sensing circuitry configured to generate the first signal in position P1, and control circuitry 60 is configured to cause main braking system 40 to actuate in response to receiving the first signal. The sensing circuitry of the foot pedal may be further configured to generate second signal in position P2 of the brake pedal, and control circuitry 60 is configured to cause auxiliary braking system 50 to actuate in response to receiving the second signal. The sensing circuitry of the foot pedal may be configured to provide substantially no signal or the third signal position P3, such that control circuitry 60 refrains from causing either auxiliary braking system 50 or main braking system 40 to actuate when the foot pedal is in position P3. Other interfaces may be used in other examples, as discussed below.

Housing 54, torque tube 52, splines 84, and/or drive keys 90, as well as other components described herein, may be made from any suitable material. For example, the material may be any material of suitable strength for the intended use of housing 54, torque tube 52, splines 84, and/or drive keys 90. In some examples, the material includes a metal or a metal alloy. For example, the material may include a nickel alloy or steel alloy. As one example, the material may include stainless steel.

Housing 54, torque tube 52, splines 84, drive keys 90, and other structures described herein can be formed using any suitable technique. In some examples, housing 54, torque tube 52, splines 84, and/or drive keys 90 may be forged, casted, made from bar stock, additive manufactured (e.g., three-dimensionally (3D) printed), extruded, drawn, or be produced using other suitable methods. In some examples, housing 54, torque tube 52, splines 84, and/or drive keys 90 may be machined to define the configurations described herein. In other examples, housing 54, torque tube 52, splines 84, and/or drive keys 90 may be formed without having to be substantially machined.

In some examples, wheel 10 may be finish machined from a near-net-shaped aluminum forging and contain and axial assembly and/or wheel rim for assembly of auxiliary braking system 50 onto wheel 10. In other examples, wheel 10 may be manufactured in a different manner. In yet other examples, wheel 10 may be obtained rather than manufactured. Wheel 10 may be made of any suitable material. In some examples, wheel 10 includes a metal or a metal alloy. For example, wheel 10 may include aluminum, a nickel alloy, a steel alloy (e.g., stainless steel), titanium, a carbon-composite material, or magnesium.

Control circuitry 60 may comprise a processor, memory, and input/output (I/O) peripherals. In examples, control circuitry 60 may include any one or more of a microcontroller (MCU), e.g., a computer on a single integrated circuit containing a processor core, memory, and programmable input/output peripherals, a microcontroller (μP), e.g., a central processing unit (CPU) on a single integrated circuit (IC), a digital signal processor (DSP), an application specific integrated circuit (ASIC), a field-programmable gate array (FPGA), a system on chip (SoC) or equivalent discrete or integrated logic circuitry. The control circuitry 60 may include integrated circuitry, i.e., integrated control circuitry, and the integrated control circuitry may be realized as fixed hardware processing circuitry, programmable processing circuitry and/or a combination of both fixed and programmable processing circuitry. The memory may include any volatile or non-volatile media, such as a random access memory (RAM), read only memory (ROM), non-volatile RAM (NVRAM), electrically erasable programmable ROM (EEPROM), flash memory, and the like. In addition, in some examples, the memory or another memory may also store executable instructions for causing the one or more controllers described herein to perform the actions attributed to them.

User interface 68 may have any suitable configuration. For example, in addition to or instead of a foot pedal, user interface 85 can include a button or keypad, a speaker configured to receive voice commands from a user, a display, such as a liquid crystal (LCD), light-emitting diode (LED), or organic light-emitting diode (OLED). In some examples, user interface 68 may include a touch screen. User interface 85 is configured to receive user input, e.g., in the form of placing a foot pedal in a specific position and/or pressing one or more buttons on a keypad or via a touch screen, which may be a user input selecting a desired braking system for actuation. In some examples, user interface 68 is also configured to display information, such as one or more indications providing information on the actuation of auxiliary braking system 50 or main braking system 40.

Communication links 62, 64, 66 may be hard-line and/or wireless communications links. In some examples, communication links 62, 64, 66 may comprise some portion of control circuitry 60. In some examples, communication links 62, 64, 66 comprise a wired connection, a wireless Internet connection, a direct wireless connection such as wireless LAN, Bluetooth™, Wi-Fi™, and/or an infrared connection. Communication links 62, 64, 66 may utilize any wireless or remote communication protocol.

Brake discs described herein, including stator discs 75, 76 and rotor discs 79-81 of auxiliary braking system 50 and brake discs of main braking system 40, may be manufactured from any suitable material. In some examples, the brake discs described herein may be manufactured from a metal or a metal alloy, such as a steel alloy. In some examples, the brake discs may be manufactured from a carbon-carbon composite material. In some examples, the brake discs may be manufactured using a carbon-carbon composite material having a high thermal stability, a high wear resistance, and/or stable friction properties. The brake discs may include a carbon material with a plurality of carbon fibers and densifying material. The carbon fibers may be composed of carbon or carbon precursor materials such as polyacrylonitrile (PAN) or rayon, which may be converted into carbon thorough a carbonization process. The carbon fibers may be arranged in a woven or non-woven as either a single layer or multilayer structure.

Figure 8:
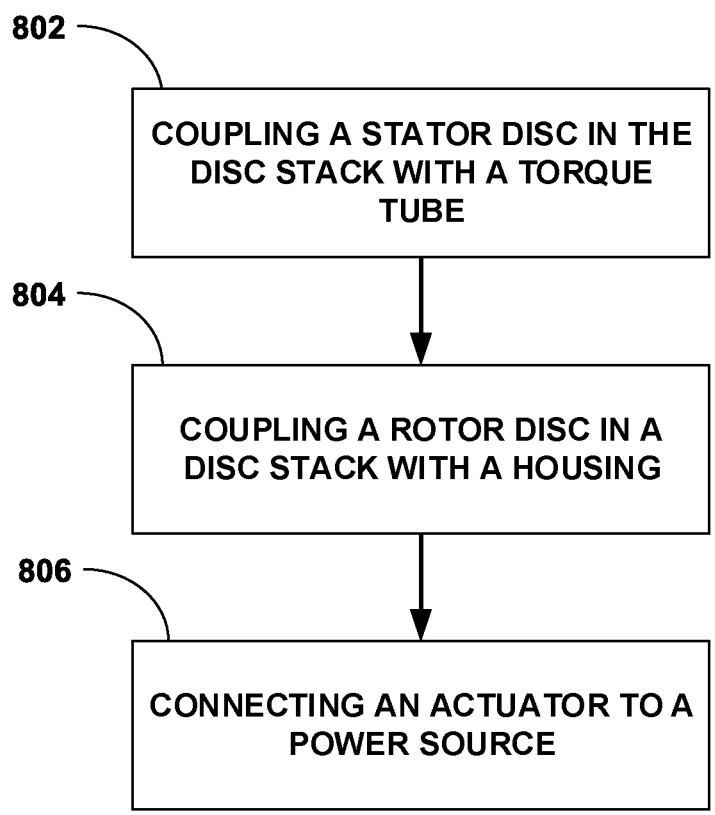
FIG. 8 is a flow diagram illustrating an example technique of braking a wheel.

FIG. 8 is a flow diagram illustrating an example technique for assembling an auxiliary brake system to a wheel. While the technique is described with reference to specific example auxiliary brake system 50 and wheel 10 described herein, the technique may be used with other examples components described herein. The technique includes coupling stator discs 75, 76 with a torque tube 52 (802). For example, stator discs 75, 76 may be coupled to torque tube 52 using spline 84 attached to torque tube 52. The technique may include engaging spline 84 and an inner perimeter 89 of stator discs 75, 76 such as inner perimeter 89 of stator disc 75. Engaging spline 84 and inner perimeter 89 may include extending spline 84 through spline slot 88 on inner perimeter 89. In examples, the technique includes coupling stator discs 75, 76 to torque tube 52 by slidably translating stator discs 75, 76 over torque tube 52.

Torque tube 52 may include an insertion section 106 and an extension section 107. The technique may include coupling stator discs 75, 76 to extension section 107. The technique may include connecting insertion section 106 to wheel 10 using a fastener, such as pins 51, 53. In some examples, the technique includes inserting insertion section 106 into an axial assembly 28 of wheel 10. The technique may include inserting insertion section 106 into mandrel 126 within axial assembly 28.

The technique of FIG. 8 further includes coupling rotor discs 79-81 with a housing 54 configured to rotate around a wheel axis A of wheel 10 (804). In examples, rotor discs 79-81 are configured to rotate around wheel axis A. Rotor discs 79-81 may be coupled to housing 54 using drive key 90 attached to housing 54. The technique may include engaging drive key 90 and an outer perimeter of rotor discs 79-81, such as outer perimeter 77 of rotor disc 79. Engaging drive key 90 and outer perimeter 77 may include extending drive key 90 drive key 90 through drive key 90 on outer perimeter 77.

In examples, the technique includes interleaving stator discs 75, 76 and rotor discs 79-81. For example, the technique may include alternately surrounding a portion of torque tube 52 (e.g., extension section 107) with an inner perimeter (e.g., inner perimeter 89) of a stator discs 75, 76 followed by surrounding the portion of torque tube 52 with an inner perimeter (e.g., inner perimeter 83) of a rotor disc 79-81. The technique may include positioning one of stator discs 75, 76 or rotor discs 79-81 adjacent a pressure plate 102 mechanically connected to an actuator 82 prior to interleaving stator discs 75, 76 and rotor discs 79-81, followed by positioning a backing plate 104 such that interleaved stator discs 75, 76 and rotor discs 79-81 are between pressure plate 102 and backing plate 104. In some examples, the technique includes positioning one or stator discs 75, 76 or rotor discs 79-81 adjacent a backing plate 104 in mechanical communication with torque tube 52 prior to interleaving stator discs 75, 76 and rotor discs 79-81, followed by positioning a pressure plate 102 such that interleaved stator discs 75, 76 and rotor discs 79-81 are between pressure plate 102 and backing plate 104. The technique may include mechanically connecting pressure plate 102 and an actuator 82. The technique may include coupling rotor discs 79-81 with housing 54 by slidably translating housing 54 over the interleaved stator discs 75, 76 and rotor discs 79-81.

The technique of FIG. 8 further includes connecting actuator 82 with a power source 79 (806), e.g., via power line 71. In some examples, the technique includes extending power line 71 through axial assembly 28. In some examples, power supply 70 is an electrical power supply and power line 71 is configured to provide electrical power to auxiliary brake system 50. In some examples, power line 71 is a conduit configured to deliver a pressurized fluid, such as a hydraulic or pneumatic conduit, and power supply 70 is configured to deliver the pressurized fluid.

In some examples, the technique of FIG. 8 may include rotationally coupling housing 54 with wheel 10. For example, housing 54 may be connected to an outboard section 23 of a wheel rim 12 using one or more fasteners, such as pins 55, 56. The technique may include coupling torque tube 52 to axial assembly 28 of wheel 10. Torque tube 52 may be connected to axial assembly 28 using one or more fasteners, such as pins 51, 53. In examples, the technique includes attaching auxiliary brake system 50 to the outboard section 23 of wheel 10 when a main brake system 40 is positioned on an inboard section 22 of wheel 10.

Although FIG. 10 is described with reference to a technique performed by an operator, in some examples, all or part of the technique shown in FIG. 10 can be automatically performed by a machine.

Various examples have been described. These and other examples are within the scope of the following claims.

What is claimed is:

1. An auxiliary braking system comprising:
   a torque tube defining a wheel axis of a wheel, wherein the torque tube includes an insertion portion configured to insert within a volume defined by an assembly supporting the wheel;
   a housing configured to rotate around the wheel axis relative to the torque tube;
   a disc stack comprising:
      a plurality of rotor discs rotationally coupled with the housing; and
      a plurality of stator discs coupled with the torque tube and interleaved with the plurality of rotor discs, wherein the torque tube is configured to limit rotational movement of the plurality of stator discs relative to the torque tube when the plurality of stator discs are coupled to the torque tube; and
   an actuator configured to compress the disc stack, wherein the actuator includes an actuator body mechanically connected to the insertion portion of the torque tube.

2. The auxiliary braking system of claim 1, wherein one or more rotor discs of the plurality of rotor discs and one or more stator discs of the plurality of stator discs are configured to translate in a direction substantially parallel to the wheel axis.

3. The auxiliary braking system of claim 1, wherein the actuator is configured to exert a force on the disc stack in a direction substantially parallel to the wheel axis when the actuator compresses the disc stack.

4. The auxiliary braking system of claim 1, further comprising a backing plate coupled to the torque tube, wherein the actuator is configured to compress the disc stack against the backing plate.

5. The auxiliary braking system of claim 1,
   wherein the actuator body is configured to remain substantially stationary with respect to the torque tube when the actuator body is mechanically connected to the insertion portion of the torque tube; and
   wherein the actuator comprises an actuating element configured to translate relative to the actuator body to compress the disc stack.

6. The auxiliary braking system of claim 1, wherein the actuator comprises an electric motor configured to compress the disc stack.

7. The auxiliary braking system of claim 1, further comprising control circuitry in communication with the actuator, wherein the control circuitry is configured to:
   receive a braking signal; and
   cause the actuator to compress the disc stack in response to receiving the braking signal.

8. A braking system, comprising:
   the auxiliary braking system of claim 1;
   control circuitry configured to receive a braking signal; and
   a main braking system comprising a main disc stack, wherein the control circuitry is configured to at least one of cause the actuator to compress the disc stack or cause the main braking system to compress the main disc stack based on the braking signal.

9. The auxiliary braking system of claim 1, wherein the insertion portion is configured to couple with the assembly, wherein the assembly surrounds the wheel axis, and wherein the housing is configured to rotationally couple with a wheel rim configured to rotate around the assembly.

10. The auxiliary braking system of claim 1, wherein the wheel axis intersects the actuator.

11. The auxiliary braking system of claim 1, wherein the plurality of stator discs are configured to impart a torque on the torque tube when the housing rotates relative to the torque tube and the compression of the disc stack causes the plurality of stator discs to engage the plurality of rotor discs.

12. The auxiliary braking system of claim 11, wherein the torque tube includes one or more splines configured to limit the rotational movement of the plurality of stator discs relative to the torque tube, and wherein the plurality of stator discs are configured to impart the torque via the one or more splines.

13. The auxiliary braking system of claim 1, further comprising:
   a pressure arm configured to compress the disc stack,
   wherein the pressure arm extends through an access providing a passage through the torque tube from an interior surface of the torque tube to an exterior surface of the torque tube, and
   wherein the actuator is configured to compress the disc stack by at least exerting a force on the pressure arm to cause the pressure arm to compress the disc stack.

14. A braking system for a wheel, the braking system comprising:
   a main braking system comprising a main disc stack;
   an auxiliary braking system, the auxiliary braking system comprising:
      a torque tube defining a wheel axis;
      a housing configured to rotate around the wheel axis;
      a disc stack comprising:
         a plurality of rotor discs rotationally coupled with the housing; and
         a plurality of stator discs coupled with the torque tube and interleaved with the plurality of rotor discs; and
      an actuator within the torque tube and configured to compress the disc stack; and
   control circuitry configured to receive a braking signal, wherein the control circuitry is configured to at least one of cause the actuator to compress the disc stack or cause the main braking system to compress the main disc stack based on the braking signal.

15. The braking system of claim 14, wherein one or more rotor discs of the plurality of rotor discs and one or more stator discs of the plurality of stator discs are configured to translate in a direction substantially parallel to the wheel axis.

16. The braking system of claim 14, wherein the actuator is configured exert a force on the disc stack in a direction substantially parallel to the wheel axis when the actuator compresses the disc stack.

17. The braking system of claim 14,
   wherein the torque tube is configured to limit rotational movement of the plurality of stator discs relative to the torque tube when the plurality of stator discs are coupled to the torque tube,
   wherein the torque tube includes an insertion portion configured to insert within a volume defined by an interior surface of an assembly supporting the wheel, wherein the main braking system comprises a main torque tube coupled to the main disc stack, and wherein the main torque tube is configured to at least partially surround an exterior surface of the assembly.

18. The braking system of claim 17, further comprising the assembly.

19. A method comprising:

receiving, by control circuitry, a braking signal; and causing, by the control circuitry, an actuator of an auxiliary braking system to compress a disc stack in response to receiving the braking signal, wherein the auxiliary braking system comprises, a torque tube defining a wheel axis of a wheel, wherein the torque tube includes an insertion portion configured to insert within a volume defined by an assembly supporting the wheel;

a housing configured to rotate around the wheel axis relative to the torque tube; the disc stack, wherein the disc stack comprises, a plurality of rotor discs rotationally coupled with the housing; and a plurality of stator discs coupled with the torque tube and interleaved with the plurality of rotor discs, wherein the torque tube is configured to limit rotational movement of the plurality of stator discs relative to the torque tube when the plurality of stator discs are coupled to the torque tube; and the actuator, wherein the actuator includes an actuator body mechanically connected to the insertion portion of the torque tube.

20. The method of claim 19, wherein the actuator body is configured to remain substantially stationary with respect to the torque tube when the actuator body is mechanically connected to the insertion portion of the torque tube, and wherein the actuator comprises an actuating element configured to translate relative to the actuator body, and further comprising translating the actuating element to compress the disc stack.

* * * * *